No. 791,187. PATENTED MAY 30, 1905.
G. W. DONNING.
PAPER FEEDING AND CONTROLLING DEVICE.
APPLICATION FILED FEB. 14, 1903.
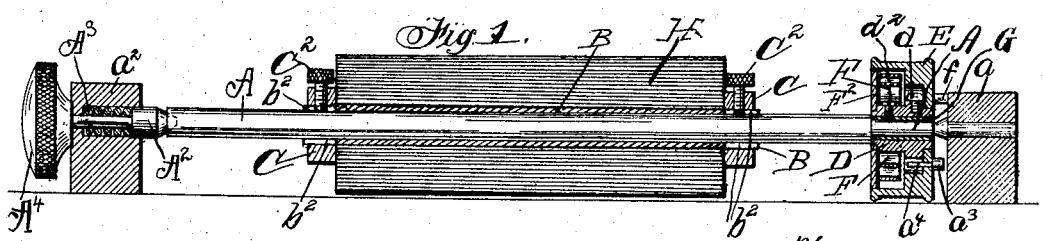
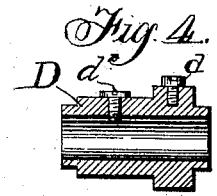
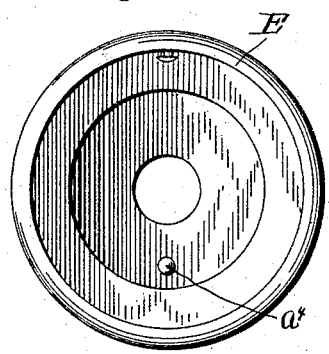
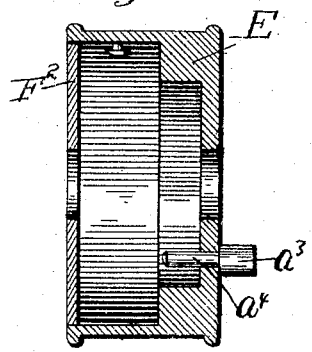
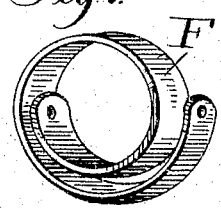
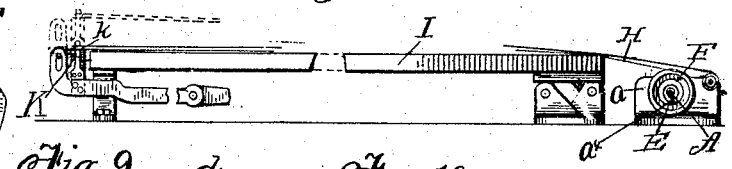
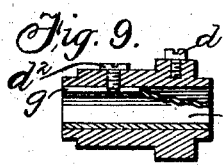
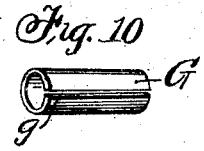
WITNESSES:
Eugene M Sliney
Edmund H Parry
INVENTOR,
George W. Donning
by R. S. Dyrenforth,
his Attorney.

No. 791,187.　　　　　　　　　　　　　　　　　　　　　　　　Patented May 30, 1905.

UNITED STATES PATENT OFFICE.

GEORGE W. DONNING, OF EAST ORANGE, NEW JERSEY, ASSIGNOR TO HARRY T. AMBROSE, OF ORANGE, NEW JERSEY.

PAPER FEEDING AND CONTROLLING DEVICE.

SPECIFICATION forming part of Letters Patent No. 791,187, dated May 30, 1905.

Application filed February 14, 1903. Serial No. 143,421.

*To all whom it may concern:*

Be it known that I, GEORGE W. DONNING, a citizen of the United States, residing at East Orange, in the county of Essex and State of New Jersey, have invented certain new and useful Improvements in Paper Feeding and Controlling Devices; and I do hereby declare the following to be a full, clear, and exact description of the invention, such as will enable others skilled in the art to which it appertains to make and use the same.

The object of this invention is to provide means for tensioning the carbon or other paper for use, especially in type-writing machines which print upon the work in a flat form.

Another object is to provide means for frictionally controlling the feeding of the carbon-paper in such devices from the tension-roll.

Another object is to provide means for carrying the carbon or other paper, said means provided with ends detachably and yieldingly disposed in a support.

Another object is to provide as an article of commerce a spindle for carrying a carbon-sheet, said spindle having yielding ends to be removably secured to a shaft carried by the machine.

Another object is to provide a carbon-carrying spindle disposed upon a shaft and means for operatively securing the spindle and shaft.

Another object is to provide a carbon-carrying spindle, a shaft upon which the spindle is supported, and means for securing the spindle upon the shaft in such manner as to permit adjustment of the same upon its shaft for different widths of carbon, whereby the carbon may be positioned at any predetermined point.

Another object is to provide means for maintaining the carbon or writing material taut while the opposite end of the same is being raised to separate it from its contacting paper sheet.

With these objects in view and others my invention comprehends the details of construction, arrangement, and combination, as hereinafter set forth, with reference to the drawings, and then pointed out in the claims.

In the drawings, representing an apparatus embodying my invention in my preferred form, Figure 1 shows the device in vertical section, certain parts being in elevation. Fig. 2 shows the carbon sleeve. Fig. 3 shows the carbon-sleeve clamp. Fig. 4 shows the tension-sleeve. Fig. 5 shows the tension-drum in section. Fig. 6 shows the tension-drum in elevation. Fig. 7 shows the winding-spring; and Fig. 8 is a side elevation of the device, showing the carbon-sheet-raising means. Fig. 9 is a view in front elevation, in detail, of a split sleeve and its encircling collar disposed within its tension-drum. Fig. 10 is a view in perspective of a split sleeve alone, the split side thereof appearing at the front.

In the several views of the drawings, in which the characters of reference indicate the same parts, A is a shaft supported by bearing-blocks $a$ $a^2$, one bearing being slidable, so as readily to remove the shaft when desired. The bearing-spindle $A^2$ is retained in engagement with the shaft A by a helical spring $A^3$, against the force of which it may be withdrawn by the knob $A^4$. By this means the shaft is normally held against rotation—that is, its rotation is retarded to prevent undesirable movement of the same.

A sleeve B is slidably mounted on the shaft A and has a ring or collar C secured to one or both ends. A knurled headed set-screw $C^2$ is threaded in each collar and may pass through slots $b$ $b$ and engaging the shaft A secure the sleeve in various positions along the shaft. Instead of having the slots the screws may bear on the sleeve B and press it against the shaft, and the sleeve may be of less thickness where engaged by the screws. Preferably this sleeve is non-rotatably secured to the shaft by means of the collars C and the set-screws $C^2$, though it is obvious that, if desired, said sleeve may be arranged to rotate upon said shaft A.

On one end of the shaft A is arranged a split sleeve G, which is preferably made of a diameter somewhat less than the diameter of the shaft A and has a slot $g$ extending throughout its entire width, and the same is thus frictionally retained on said shaft A, the frictional resistance thereof being sufficient to retain this sleeve G in a fixed position upon the shaft, except as hereinafter stated. Surrounding this sleeve G is a rotatable collar D, preferably of the same width as the sleeve and provided with a pin or screw $a^2$ at one end which extends into the slot $g$ in the sleeve G, so that as said sleeve is rotated the collar D is rotated therewith. Rotatably surrounding the rotatable collar D is a rotatable drum E, and between this drum and the collar D is connected an evolute spring F, which encircles the collar D. Secured exteriorly on the drum E is a stop-pin $a^3$, which is designed to strike a pin $f$, disposed on the bearing-block $a$ in the path of said pin $a^3$, whereby but one revolution of the drum is permitted. Within the drum and preferably formed as an extension of the pin $a^3$ is another pin $a^4$, which is arranged to strike against a screw or pin $d$, preferably threaded into the enlarged portion of the collar D beyond the pin or screw $d^2$, and limits the extent of rotation of the drum E on the collar D. A disk $F^2$ closes the drum E at one end.

The length or breadth of carbon or other paper H is wound or supported on the sleeve B and the end thereof passed over the platen I and then secured to a suitable clamp $k$ and member K on the machine.

It is to be understood, as already pointed out, that the split sleeve G is only frictionally mounted on the end of the shaft A, the frictional resistance thereof being sufficient to retain this sleeve in a fixed position upon the shaft A as against the action of the tension-spring E, as hereinafter described.

Now the carbon or paper is wound upon the sleeve B in such direction that in unwinding it will be drawn forward toward the clamping member $k$, and this operation will cause said sleeve B and the shaft A (the sleeve B being preferably non-rotatably secured to the shaft A) to rotate slightly and permit the unwinding of the paper from said sleeve. During the rotation of this sleeve B and shaft A the split sleeve $g$ (at the end of said shaft and which, as already stated, is frictionally mounted on said shaft) is also given rotation, and this rotates the collar D and drum E until the pin $a^3$ on the drum strikes the pin $f$ on the block $a$, which stops further rotation of the drum. Then the collar D, its sleeve, and the shaft continue to rotate until the screw or pin $d$ strikes the pin $a^4$ projecting within the drum E. This prevents further rotation of the collar D and sleeve G. Now when the drum has been stopped in its revolution, as just described, by the pins $a^3$ and $f$ engaging and while the collar D is continuing its rotation within this drum the spring F (which has one end secured to the drum and the other to the collar D) is caused to be tensioned until the pin $d$ strikes the pin $a^4$, whereupon if the pull on the paper or carbon is discontinued said spring will cause rotation of said collar in an opposite direction, and this rotates the sleeve G and shaft A until the screw or pin $d$ impinges against the pin $a^4$ on its opposite side. This stops further rotation of the shaft A in that direction, and thereby prevents the entire winding up of the carbon upon the sleeve B upon release of the carbon at its free end intentionally or accidentally. If, however, the pull on the carbon or paper is continued after the spring is tensioned, the sleeve G by reason of its being only frictionally mounted on the shaft A will yield and permit the shaft A to rotate within this sleeve G on its end bearings without disturbing the tensioning device, which when the pull on the paper or carbon is released will tend to rotate the shaft in the opposite direction, as just described. When the end of the carbon-paper has been secured in the clamp $k$, the spring F, which has been put under tension, as just described, will unwind and rotate the shaft in a direction opposite to that in which it has been pulled until such rotation is stopped, as above described, to prevent the entire winding up of the carbon upon the sleeve B, and this operation takes up any slack in the carbon-sheet and keeps it drawn taut across the platen.

By the construction I provide a means for exerting a constant drawing or pull upon the paper in a direction opposite to its feeding, with a view normally to maintain the paper taut across the platen, and thus remove all slack therefrom.

The clamp $k$ on the member K may, if desired, be part of a carbon-sheet separator, such as described in a concurrent pending application of mine serially numbered 142,787, filed February 10, 1903, and the device herein set forth is designed to be employed in connection therewith, so that when the operation of separating the carbon from the paper is occurring the carbon-sheet is held perfectly taut, though yieldingly so, in its several positions.

After a portion of the paper is used or worn a fresh portion is unwound and drawn over the platen and clamped at $k$, when the used part may be torn or cut off. It will be observed that while the paper is unwinding from the roll A the spring will constantly keep the roll under tension, tending to wind it up again for almost a complete revolution; but if too much slack has been provided, so that the one revolution given to the roll A is not sufficient to take up all the slack when the end has been clamped at $k$, the tension-screws $C^2$ can be loosened and the roll A turned back to wind up the paper again, when the screws can be set again.

It is to be understood that this device, either by itself or combined with the carbon-separator above referred to, may be employed in connection with an ordinary writing pad or book where a plurality of autograph or other copies are to be made.

Without limiting myself to the details of construction and arrangement set forth, what I claim as new, and desire to secure by Letters Patent, is—

1. The combination with a flat platen or writing-surface and means for holding the paper across the platen, of a rotatable paper-holding device, supporting-blocks therefor, a rotatable tension device disposed contiguous to one of the blocks, means constructed, when the paper-holding device is rotated, to effect an engagement of the tension device with the paper-holding device to place the tension device under tension, and means carried by the tension device and the supporting-block and constructed to limit rotation of the tension device, substantially as described.

2. The combination with a flat platen or writing-surface and means for holding the paper across the platen, of a rotatable paper-holding device, supporting-blocks therefor, a rotatable tension device disposed contiguous to one of the blocks, means constructed, when the paper-holding device is rotated, to effect an engagement of the tension device with the paper-holding device to place the tension device under tension, and means carried by the tension device and the supporting-block and constructed to limit rotation of the tension device, said tension device being constructed and arranged, when it has engaged with the paper-holding device, to effect rotation of this device in the opposite direction to draw the paper taut, substantially as described.

3. The combination with a flat platen or writing-surface, of means for supporting a roll of paper with a portion extending across the platen, means for securing the end of the paper, means for retarding the unwinding of the paper from said supporting means, and means constructed and arranged to exert a constant drawing upon the paper in a direction opposite to its feeding, normally to maintain the paper taut across the platen, substantially as described.

4. The combination with a flat platen or writing-surface and means for holding the paper across the platen, of a rotatable paper-holding device, supporting-blocks therefor, a rotatable tension device disposed contiguous to one of the blocks, means constructed, when the paper-holding device is rotated, to effect an engagement of the tension device with the paper-holding device to place the tension device under tension, and means carried by the tension device and the supporting-block and constructed to limit rotation of the tension device, said tension device being constructed and arranged, when it has engaged with the paper-holding device, automatically to effect rotation of this device in the opposite direction to draw the paper taut, substantially as described.

5. The combination with a flat platen or writing-surface, of means for supporting a web of paper with a portion extending across the platen, means for securing the end of the paper, means for retarding the unwinding of the paper from said supporting means, and means on the support constructed and operating to keep the paper under tension and also to exert a constant drawing upon the paper in a direction opposite to its feed, normally to maintain it taut across the platen, substantially as described.

6. The combination with a flat platen, of a shaft, a sleeve on the shaft arranged to receive a web of paper with a portion extending across the platen, means for securing the paper at one portion to the platen, and tensioning means connected with the shaft and arranged to rotate the shaft and sleeve in a direction opposite to the feed of the paper, thus tending to wind the paper back on the sleeve and keep it drawn taut across the platen and a friction device between the tensioning means and the shaft arranged to cause the sleeve to rotate the tensioning means and put the same under tension, and then permit the shaft to rotate in the tension means, substantially as described.

7. The combination with a flat platen or writing-surface and means for holding the paper across the platen, of a rotatable paper-holding device, supporting-blocks therefor, a tension device disposed contiguous to one of the blocks, means constructed, when the paper-holding device is rotated, to effect an engagement of the tension device with the paper-holding device to place the tension device under tension, means carried by the tension device and the supporting-block and constructed to limit rotation of the tension device, and means for adjusting the paper-holding device, substantially as described.

8. The combination of a shaft, a sleeve mounted on the shaft, a tension device tending to rotate the shaft, and a friction device between the tension device and shaft arranged to cause the sleeve to rotate the tension device and put the same under tension, and then permit the shaft to rotate independent of the tension device, substantially as described.

9. The combination of a shaft, a sleeve slidably mounted thereon, a paper-holding roll disposed upon the sleeve, a collar at each end of the roll, a screw threaded in each collar and arranged to cause the sleeve to engage and be locked to the shaft, rotating means engaging said shaft for effecting a tension thereon, during its rotation, means for maintaining the same under such tension during further rotation of the shaft said rotating tensioning means being constructed for effecting rotation of the shaft in the opposite direction.

10. The combination of a rotatable shaft, a sleeve mounted on the shaft, a drum surrounding the sleeve, a spring connected between the drum and the sleeve, a stop arranged to limit the rotation of the drum on the sleeve, a stationary stop arranged to limit the rotation of the drum, and a friction device between the tension device and the shaft arranged to permit the shaft, when rotated, first to rotate the tension device and put the spring under tension and then to rotate in the tension device, substantially as described.

11. The combination of a shaft, a sleeve mounted on the shaft intermediate of, and of less length than, the length of the shaft, and constructed to support a paper element, a rotatable collar disposed contiguous to one end of the shaft and independent of the sleeve, a drum encircling the collar and constructed to have partial rotation, a tension device positioned within and engaging the drum and the collar and constructed to have limited rotation within the drum in one direction and then automatically to effect rotation of the collar and this, in turn, of the shaft, in an opposite direction.

12. The combination of a shaft, a sleeve mounted on the shaft intermediate of, and of less length than, the length of the shaft and constructed to support a paper element, a rotatable collar disposed contiguous to one end of the shaft and independent of the sleeve, a drum encircling the collar and constructed to have a partial rotation, a tension device positioned within and engaging the drum and the collar and constructed to have limited rotation within the drum in one direction and then automatically to effect rotation of the collar and this, in turn, of the shaft in an opposite direction, and means for limiting the rotation of the drum in one direction.

13. The combination of a shaft, a sleeve mounted on the shaft intermediate of, and of less length than, the length of the shaft and constructed to support a paper element, a rotatable collar disposed contiguous to one end of the shaft and independent of the sleeve, a drum encircling the collar and constructed to have partial rotation, a tension device positioned within and engaging the drum and the collar and constructed to have limited rotation within the drum in one direction and then automatically to effect rotation of the collar and this, in turn, of the shaft in an opposite direction, and means for limiting rotation of the tension device in one direction.

14. The combination of a shaft, a sleeve mounted on the shaft intermediate of, and of less length than, the length of the shaft and constructed to support a paper element, a rotatable collar disposed contiguous to one end of the shaft and independent of the sleeve, a drum encircling the collar and constructed to have partial rotation, a tension device positioned within the drum and engaging the same and the collar and constructed to have limited rotation within the drum in one direction and then automatically to effect rotation of the collar and this, in turn, of the shaft in an opposite direction, means for limiting the rotation of the drum in one direction, and means for limiting rotation of the tension device within the drum in one direction.

15. The combination with a flat platen, or writing-surface, of means for holding the end of a sheet of paper at one end of the platen, a rotatable shaft arranged contiguous to the opposite end of the platen, a paper-carrying device normally rigid upon said shaft, a collar also normally rigid upon and rotatable with said shaft, a tension device connecting with said collar, a drum encompassing said collar and with which the tension device is also connected, and means for permitting simultaneous partial rotation of the drum and collar with the shaft and, then, to lock the same against further rotation and permit rotation of the shaft in the opposite direction under the action of the tension device, substantially as described.

16. The combination with a flat platen, or writing-surface, of means for holding the end of a sheet of paper at one end of the platen, a rotatable shaft arranged contiguous to the opposite end of the platen, adjustable supports in which the shaft rotates, a paper-carrying device normally rigid upon said shaft, a collar also normally rigid upon and rotatable with said shaft, a tension device connecting with said collar, a drum encompassing said collar and with which the tension device is also connected, and means for permitting simultaneous partial rotation of the drum and collar with the shaft and, then, to lock the same against further rotation and permit rotation of the shaft in the opposite direction under the action of the tension device, substantially as described.

17. The combination with a flat platen, or writing-surface, of means for holding the end of a sheet of paper at one end of the platen, a rotatable shaft arranged contiguous to the opposite end of the platen, a paper-carrying device normally rigid but adjustable upon said shaft, a collar also normally rigid upon and rotatable with said shaft, a tension device connecting with said collar, a drum encompassing said collar and with which the tension device is also connected, and means for permitting simultaneous partial rotation of the drum and collar with the shaft and, then, to lock the same against further rotation and permit rotation of the shaft in the opposite direction under the action of the tension device, substantially as described.

18. The combination with a flat platen, or writing-surface, of means for holding the end of a sheet of paper at one end of the platen, a rotatable shaft arranged contiguous to the opposite end of the platen, a paper-carrying device normally rigid upon said shaft, a collar also normally rigid but adjustable upon and rotatable with said shaft, a tension device connecting with said collar, a drum encompassing said collar and with which the tension device is also connected, and means for permitting simultaneous partial rotation of the drum and collar with the shaft and, then, to lock the same against further rotation and permit rotation of the shaft in the opposite direction under the action of the tension device, substantially as described.

19. The combination with a flat platen, or writing-surface, of means for holding the end of a sheet of paper at one end of the platen, a rotatable shaft arranged contiguous to the opposite end of the platen, a paper-carrying device normally rigid upon said shaft, means for securing the paper-carrying device on the shaft in one of a plurality of positions, a collar also normally rigid upon and rotatable with said shaft, a tension device connecting with said collar, a drum encompassing said collar and with which the tension device is also connected, and means for permitting simultaneous partial rotation of the drum and collar with the shaft and, then, to lock the same against further rotation and permit rotation of the shaft in the opposite direction under the action of the tension device, substantially as described.

20. The combination with a flat platen, or writing-surface, of means for holding the end of a sheet of paper at one end of the platen, a rotatable shaft arranged contiguous to the opposite end of the platen, a paper-carrying device normally rigid upon said shaft, a collar also normally rigid upon and rotatable with said shaft, a tension device connecting with said collar, a drum encompassing said collar and with which the tension device is also connected, means for permitting simultaneous partial rotation of the drum and collar with the shaft and, then, to lock the same against further rotation and permit rotation of the shaft in the opposite direction under the action of the tension device, and means for limiting rotation of the drum, substantially as described.

21. The combination with a flat platen, or writing-surface, of means for holding the end of a sheet of paper at one end of the platen, a rotatable shaft arranged contiguous to the opposite end of the platen, a paper-carrying device normally rigid upon said shaft, a collar also normally rigid upon and rotatable with said shaft, a tension device connecting with said collar, a drum encompassing said collar and with which the tension device is also connected, means for permitting simultaneous partial rotation of the drum and collar with the shaft and, then, to lock the same against further rotation and permit rotation of the shaft in the opposite direction under the action of the tension device, and means for limiting rotation of the tension device within the drum, substantially as described.

22. The combination, with a carbon-carrying spindle, of a shaft upon which the spindle is disposed, means for securing the spindle upon the shaft yieldingly and detachably, and effecting tensioning of the carbon element, and permitting sliding of the spindle on the shaft to position the carbon element laterally thereon, substantially as described.

23. The combination with a spindle, of a carbon element having one of its ends supported on the spindle, a shaft upon which the spindle is disposed, means for yieldingly securing the spindle to the shaft, a carbon clamp and separator supporting the opposite end of the carbon element, and means carried by the spindle for effecting tensioning of the carbon element to hold the same taut during operation of the separator, substantially as described.

24. The combination with a flat platen or writing-surface, of a rotatable paper-supporting shaft, means for securing the opposite end of the paper, means for supporting the shaft, a tension device disposed contiguous to the end of said shaft, and means carried by, and rotatable with, the shaft and constructed to engage the tension device to tension the same when rotation of the shaft is in one direction and to effect a connection of the tension device with the shaft to permit the tension device to rotate the shaft in an opposite direction, substantially as described.

25. The combination with a flat platen or writing-surface, of a rotatable paper-supporting shaft, means for securing the opposite end of the paper, means for supporting the shaft, a tension device disposed contiguous to the end of said shaft, means carried by, and rotatable with, the shaft and constructed to engage the tension device to tension the same when rotation of the shaft is in one direction and to effect a connection of the tension device with the shaft to permit the tension device to rotate the shaft in an opposite direction, and means disposed on the tension device and constructed to engage the shaft-support to limit rotation of the shaft first in one direction and, then, in an opposite direction, substantially as described.

26. The combination with a shaft, of a material-carrying sleeve arranged adjustably and slidably thereon, means for effecting rotation of the shaft and sleeve, under tension, to a predetermined point, means for permitting further rotation thereof beyond said predetermined point, and holding means for engaging the opposite end of the material carried on the sleeve.

27. The combination with a shaft, of a material-carrying sleeve arranged thereon, means for effecting limited rotation of the shaft and sleeve, under tension, to a predetermined point, means for permitting further rotation thereof beyond said predetermined point, holding means for engaging the opposite end of the material carried on the sleeve, and means for maintaining such material taut, substantially as described.

28. The combination with a rotatable device, means for permitting said device to rotate, under tension, to a predetermined point, and means for permitting further free movement of the device beyond the said point, substantially as described.

29. The combination with a rotatable material-carrying device, means for permitting rotation of said device under tension to a predetermined point, means for permitting further free movement of said device beyond the said point, holding means engaging the opposite end of the material, and means for effecting a drawing on said material away from said holding means, substantially as described.

30. The combination with a rotatable shaft, an adjustable sleeve disposed thereon, means for retaining said sleeve on the shaft and a collar, the shaft and collar being constructed to have rotation, together, and means for preventing movement of one during the rotation of the other, substantially as described.

31. The combination with a rotatable shaft, a sleeve disposed thereon, means for retaining said sleeve on the shaft and a collar, the shaft and collar being constructed to have rotation, together, means for preventing movement of one during the rotation of the other, and means for effecting a tension on said shaft, substantially as described.

32. The combination with a rotatable shaft, a sleeve mounted on the shaft, a collar engaging with said sleeve, a tension device engaging the collar, means for retaining the sleeve and collar against movement and permitting rotation of the shaft independent of the sleeve and collar to a predetermined position, the tensioning device being constructed to effect a partial rotation of the shaft in an opposite direction to a predetermined point, substantially as described.

33. The combination with a rotatable shaft, a material-carrying sleeve disposed thereon, means for effecting engagement of the sleeve with the shaft, a sleeve on the end of the shaft, and a collar, the shaft, sleeve and collar being constructed to rotate together to a predetermined point, a tension device engaging the collar and operated when the shaft is rotated in one direction, and being constructed to effect rotation of the shaft in the opposite direction to a predetermined point, and holding means engaging the opposite end of the material carried on the sleeve, substantially as described.

34. The combination with a shaft, means for holding the same, a material-carrying sleeve disposed thereon, means for effecting engagement of the sleeve with the shaft, a collar movable with the shaft to a predetermined point, a tension device for effecting rotation of the shaft, means for holding the collar against further rotation, beyond a predetermined point, the shaft being constructed to rotate to a predetermined point to operate the tension device, and the collar being constructed to rotate independent of the shaft, substantially as described.

35. The combination with a shaft, means for holding the same, a material-carrying sleeve disposed thereon, a tension device for rotating the shaft, a collar, means for holding the collar against rotation beyond a predetermined point, the shaft being constructed to rotate to a predetermined point to operate the tension device, and the collar being constructed to rotate with the shaft, and also be rotated by the shaft when the collar is held against rotation, the tension device effecting rotation of the shaft in an opposite direction, and holding means engaging the material carried on the sleeve, substantially as described.

36. The combination with a shaft, means for supporting the shaft, a material-carrying sleeve disposed on the shaft, a tension device, a collar, the shaft and collar being constructed to have simultaneous rotation to a predetermined point, means for holding the collar against further rotation, the shaft being constructed to have rotation independent of the collar, when said collar is held against rotation, the tension device being constructed to effect rotation of the shaft and collar in an opposite direction, and holding means engaging the material carried on the sleeve, substantially as described.

37. The combination with a shaft, means for supporting the same, of a material-carrying sleeve disposed thereon, a collar, means for effecting rotation of the collar with the shaft, means for permitting rotation of the shaft independent of the collar, and means for disconnecting the shaft-supporting means from the shaft, substantially as described.

38. The combination with a rotatable shaft, of a material-carrying sleeve adjustable thereon, means for effecting rotation of the shaft, means for supporting the shaft, means for effecting disengagement of the shaft-supporting means from the shaft, a tension device, and a collar, the shaft and collar being constructed to have rotation in one direction to operate the tension device, the tension device being constructed to effect rotation of the shaft and collar in an opposite direction, substantially as described.

In testimony whereof I affix my signature in the presence of two subscribing witnesses.

GEORGE W. DONNING.

Witnesses:
 ANDREW W. STEIGER,
 JOHN R. WILTSIE.